United States Patent [19]  [11] 3,907,409
Hausmann  [45] Sept. 23, 1975

[54] AERODYNAMIC WINDOW

[75] Inventor: George F. Hausmann, Glastonbury, Conn.

[73] Assignee: United Aircraft Corporation, Hartford, Conn.

[22] Filed: Jan. 28, 1974

[21] Appl. No.: 437,114

[52] U.S. Cl. ...... 350/319; 331/94.5 G; 331/94.5 D; 330/4.3
[51] Int. Cl.² ........................ H01S 3/22; G02B 5/00
[58] Field of Search .................... 331/94.5; 330/4.3; 350/319

[56] References Cited
UNITED STATES PATENTS
3,654,569   4/1972   Hausman ........................... 331/94.5

Primary Examiner—Robert J. Webster
Attorney, Agent, or Firm—Jack N. McCarthy

[57] ABSTRACT

An improved aerodynamic window is provided for laser systems where the pressure in the lasing cavity is lower than ambient pressure. An opening is located in the system to permit a laser beam to pass from the lasing cavity to the exterior thereof. A window is needed in the opening to prevent a flow of air from the ambient pressure into the low pressure in the lasing cavity. The window consists of a multiplicity of inlet ducts on one side of the opening supplied with a high pressure gas with each duct having a Laval nozzle for expanding the gas. The ducts are curved in a manner to provide a prescribed radial variation in velocity and static pressure therein. The pressure and Mach number in the ducts associated therewith provide a centrifugal flow across the opening. An outlet duct on the other side of the opening receives the flow from the inlet ducts after the flow has crossed the opening.

2 Claims, 1 Drawing Figure

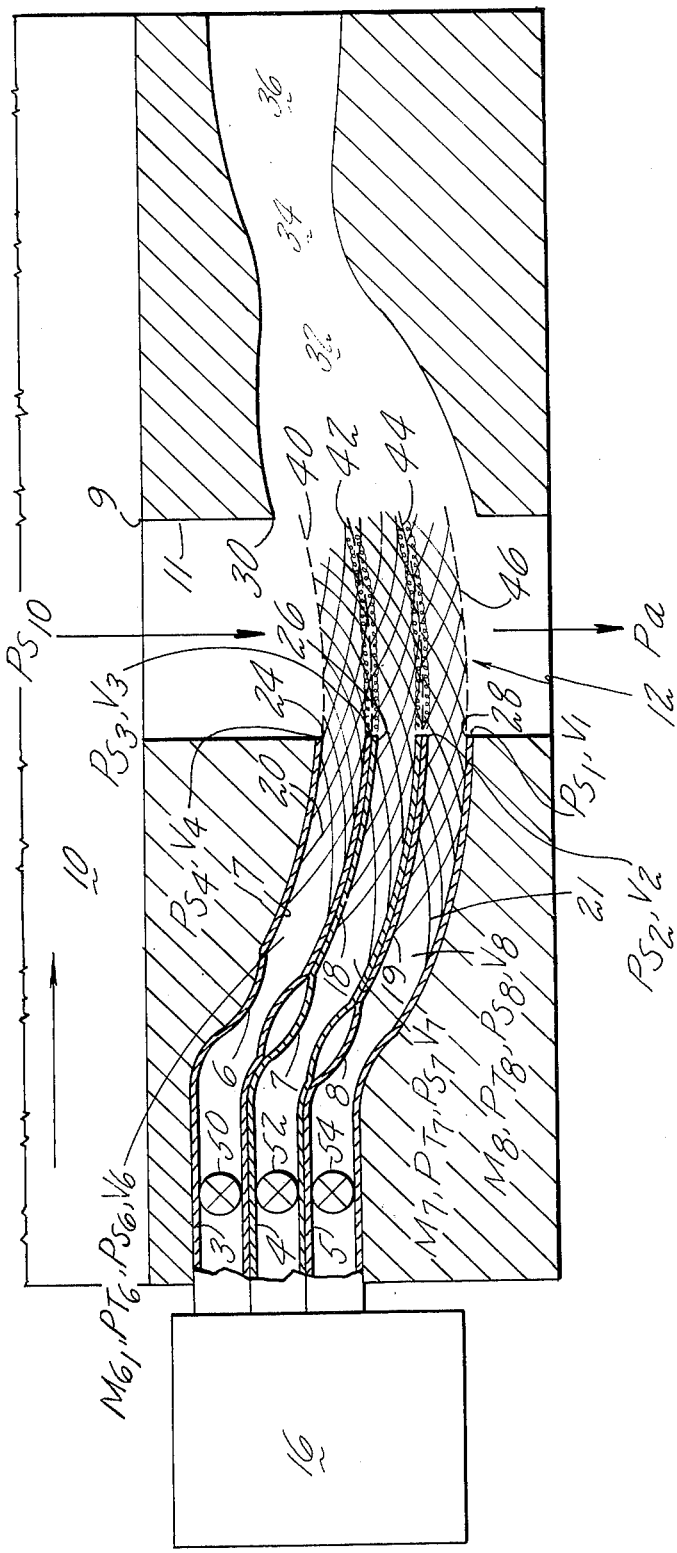

3,907,409

AERODYNAMIC WINDOW

BACKGROUND OF THE INVENTION

This invention relates to an aerodynamic window, and particularly for flowing laser systems such as gas dynamic lasers, chemical lasers and electric discharge lasers. In lasers of low power, windows with physical walls made of materials which transmit the laser wavelength have been used, but subject window is for use when the laser beam will disintegrate physical window materials. U.S. Patents which relate to aerodynamic windows are U.S. Pat. Nos. 3,604,789; 3,617,928 and 3,654,569.

SUMMARY OF THE INVENTION

A primary object of this invention is to provide an improved aerodynamic window which will permit passage of a laser beam from a lasing cavity of a low pressure to an area of higher pressure with no physical obstructions, yet prevent or minimize flow through said window between the two areas of different pressures.

In accordance with the present invention, centrifugal flow is provided across an opening between two areas of different pressures to prevent flow therebetween.

An object of the invention is to provide a multiplicity of inlet ducts curved in a manner to provide a prescribed radial variation in velocity and static pressure by virtue of the formation of expansion waves on the inner (convex) surface of each duct and compression waves on the outer (concave) surface of each duct. The individual Mach numbers in each inlet duct and the static pressure in each inlet duct together with the curvature of the duct walls provides a distribution of velocity and static pressure to provide a centrifugal flow across an opening in the laser.

BRIEF DESCRIPTION OF THE DRAWINGS

The FIGURE is a view showing the aerodynamic window placed across an opening connecting a laser cavity with ambient pressure.

DESCRIPTION OF THE PREFERRED EMBODIMENTS

A laser system includes a laser cavity 10 with an opening 9 located in the side thereof, a passage 11 extends from said opening in a direction away from the laser cavity. The laser beam from the laser cavity is directed through the opening 9 and passage 11 to perform a useful function externally of the laser system. An aerodynamic window 12 is located adjacent the cavity 10 as a part of the laser system, where the pressure in the lasing cavity is lower than the ambient pressure and the wavelength and/or power of the optical output precludes the use of a solid transparent material.

As shown in the Figure, this aerodynamic window consists of a multiplicity of inlet ducts 3, 4 and 5 which are supplied with a high pressure gas from a single pump or from individual pumps in a housing 16. Each duct is provided with a Laval nozzle 6, 7 and 8 which expands the gas in each duct to a supersonic velocity $V_6$, $V_7$ and $V_8$. Throttling is located in the ducts 3, 4 and 5 at 50, 52 and 54 respectively. This provides for either constant total pressure in the ducts or throttling to provide a variation of total pressure in the ducts. Downstream of the Laval nozzles, the ducts 3, 4 and 5 have curved portions 17, 18 and 19, respectively, which are curved in a manner to provide a prescribed radial variation in velocity and static pressure by virtue of the formation of expansion waves 20 on the inner (convex) surface of each duct and compression waves 21 on the outer (concave) surface of each duct. These curved portions 17, 18 and 19 intersect one side of the passage 11 and terminate in openings 24, 26 and 28 respectively. The individual Mach numbers $M_6$, $M_7$ and $M_8$ and the static pressures $P_{s6}$, $P_{s7}$ and $P_{s8}$ together with the curvature of the duct walls can be prescribed by well-known aerodynamic principles to provide a distribution of velocity and static pressures $P_{s1}$, $P_{s2}$, $P_{s3}$, $P_{s4}$, $V_1$, $V_2$, $V_3$ and $V_4$ to provide a centrifugal flow from openings 24, 26 and 28 across the passage 11 to a large opening 30 which connects the laser cavity 10 to the ambient environment.

A supersonic diffuser 32 having a throat 34 and subsonic diffuser 36 is provided to collect the flow in the aerodynamic window and to convert its kinetic energy to static energy, thereby reducing or eliminating the requirement for a vacuum pump at the exhaust of the aerodynamic window.

The static pressure ratio across the window, $P_a/P_{s10}$, is established by the pressure gradient across each element of the window caused by the distribution of shock and expansion waves and the resulting velocity gradient. The pressure ratio can also be related to the resulting centrifugal flow field by the use of well-known principles for the pressure gradients in centrifugal flows. It should be noted that the establishment of the prescribed centrifugal flow can be easily accomplished by varying the Mach numbers $M_8$, $M_7$ and $M_6$ in each duct; the static pressures, $P_{s8}$, $P_{s7}$, $P_{s6}$ in each duct; and the curvature of the duct walls.

It should be noted that the static pressure on each side of streamline 46 is equal to the ambient static pressure $P_a$ and that the static pressure on each side of streamline 40 is equal to the laser cavity pressure, $P_{s10}$. Likewise, the static pressure on each side of streamline 42 is equal to $P_{s3}$ and the static pressure on each side of streamline 44 is equal to $P_{s2}$.

The plurality of transverse ducts include Laval nozzles having prescribed expansion ratios to provide a variation in Mach number in each duct such that the Mach numbers in the individual ducts are decreasing in magnitude in the direction from the region of low pressure to the region of higher pressure, said variation in Mach number, velocity and duct curvature being prescribed in a manner such that the static pressure at the intersection of the duct wall and the outlet chamber nearest the region of low pressure is equal to the pressure therein, the static pressure at the intersection of the furthermost duct wall and the outlet chamber is equal to the pressure in the region of higher pressure, and the static pressures at the intersection of each intermediate wall with said outlet chamber are balances whereby the static pressure along the streamline of the innermost free boundary is equal to the pressure in the region of low pressure, the static pressure along the streamline of the outermost free boundary is equal to the atmospheric pressure and the static pressure along the streamlines emanating from the intermediate duct boundaries are balanced.

I claim:

1. In combination in a system having a region of low pressure, an opening in said region forming an exit, an outlet chamber connected to said system and extending away therefrom around said opening, and an aerodyamic window assembly permitting passage therethrough to a region of higher pressure, and aerodynamic window assembly comprising a plurality of transverse ducts connected to one side of said outlet chamber and terminating at the wall of said chamber, said plurality of said ducts extending in line along the length of said outlet chamber, said plurality of ducts each containing a Laval nozzle to generate a supersonic gas flow, pump means for supplying gas flow to said Laval nozzles, said Laval nozzles each expanding the gas passing therethrough to a supersonic velocity, said plurality of ducts being curved downstream of the Laval nozzles in a manner with said ducts each having an increasing radii of curvature in the direction from the region of low pressure to the region of higher pressure to provide a variation in velocity and static pressure along the axis of the outlet chamber by virtue of the formation of expansion waves on the inner convex surface of each duct and compression waves on the outer concave surface of each duct, said variation of static pressure increasing in magnitude in the direction from the region of low pressure to the region of higher pressure, a duct means being formed on the opposite side of said chamber to receive the flow transverse ducts, said transverse, said Laval nozzles having prescribed expansion ratios to provide a variation of Mach number in each duct such that the Mach numbers in the individual ducts are decreasing in magnitude in the direction from the region of low pressure to the region of higher pressure, said variation in Mach number, velocity and duct curvature being prescribed in a manner such that the static pressure at the intersection of the duct wall and the outlet chamber nearest the region of low pressure is equal to the pressure therein, the static pressure at the intersection of the furthermost duct wall and the outlet chamber is equal to the pressure in the region of higher pressure, and the static pressures at the intersection of each intermediate wall with said outlet chamber are balanced whereby the static pressure along the streamline of the innermost free boundary is equal to the pressure in the region of low pressure, the static pressure along the streamline of the outermost free boundary is equal to the atmospheric pressure and the static pressure along the streamlines emanating from the intermediate duct boundaries are balanced.

2. A combination as set forth in claim 1 wherein throttle valves are provided downstream of the pump means and upstream of the Laval nozzle inlets to provide a means for varying the total pressure in each of the plurality of ducts.

* * * * *

UNITED STATES PATENT OFFICE
CERTIFICATE OF CORRECTION

PATENT NO. : 3,907,409
DATED : September 23, 1975
INVENTOR(S) : George F. Hausmann It is certified that error appears in the above-identified patent and that said Letters Patent are hereby corrected as shown below:

Column 3, line 25, after "flow" insert --from said-- line 26, delete "said transverse"

Signed and Sealed this thirtieth Day of December 1975

[SEAL]

Attest:

RUTH C. MASON
Attesting Officer

C. MARSHALL DANN
Commissioner of Patents and Trademarks